April 20, 1954  P. SCHLUMBOHM  2,676,241
ELECTRIC COOKING UTENSIL
Filed May 21, 1953  3 Sheets-Sheet 1

INVENTOR.

April 20, 1954     P. SCHLUMBOHM     2,676,241
ELECTRIC COOKING UTENSIL
Filed May 21, 1953     3 Sheets-Sheet 2
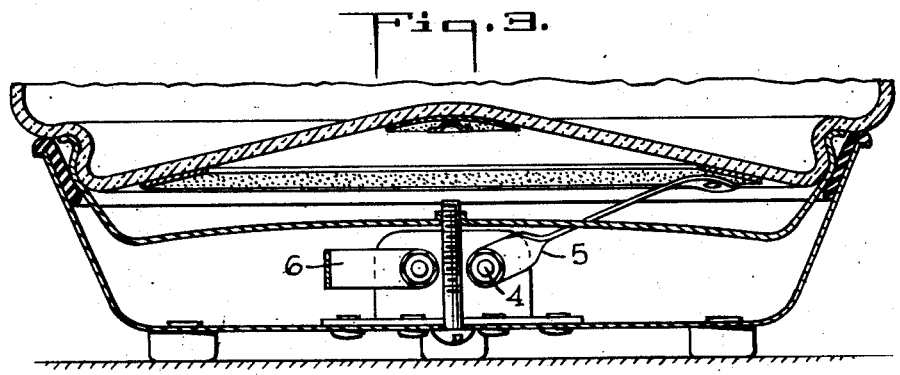
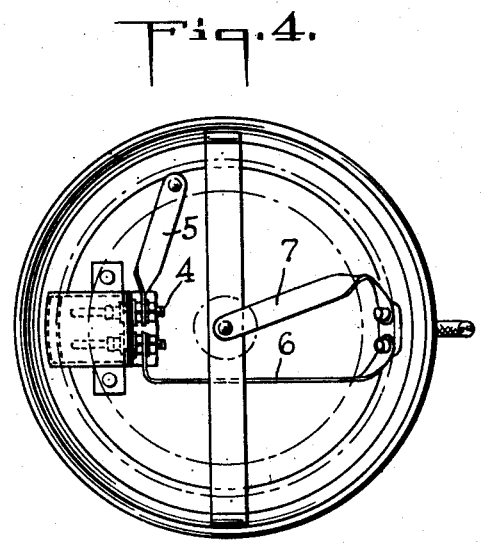
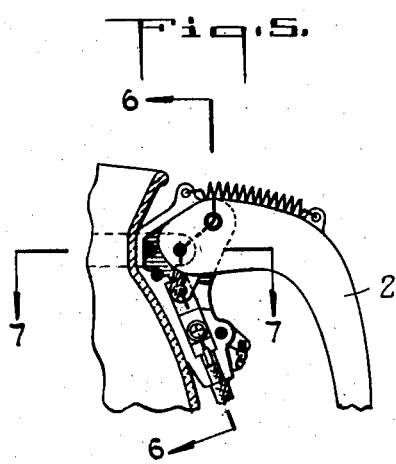
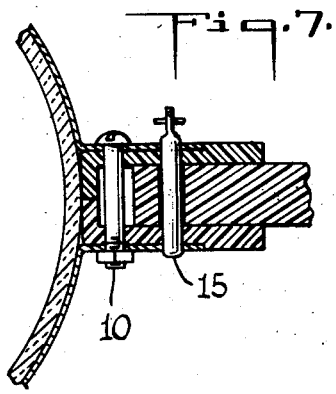
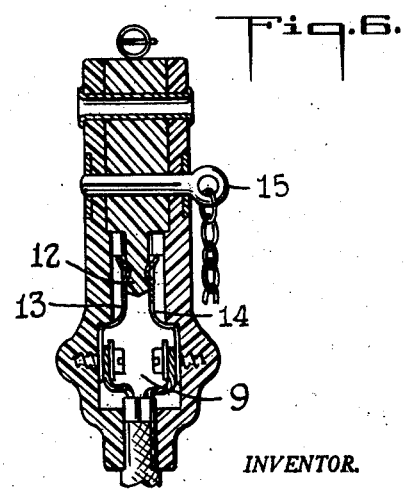
INVENTOR.

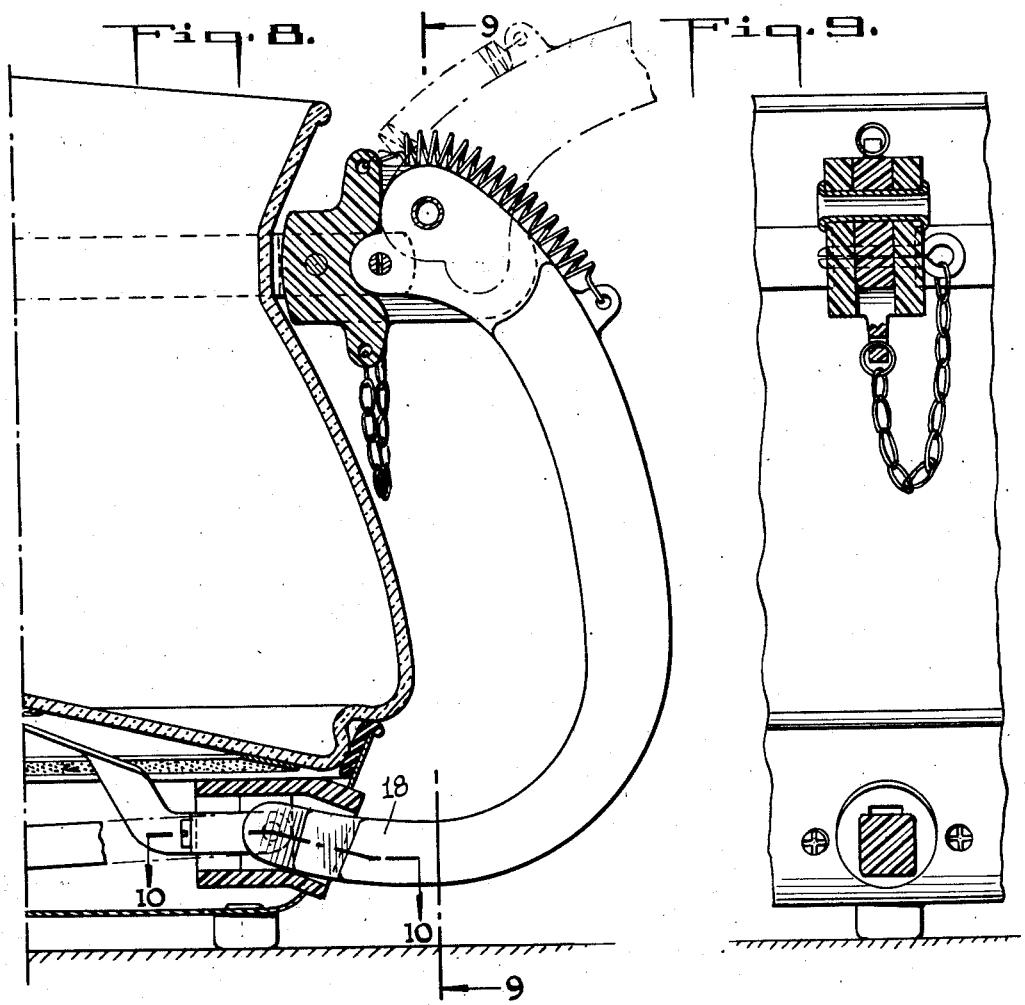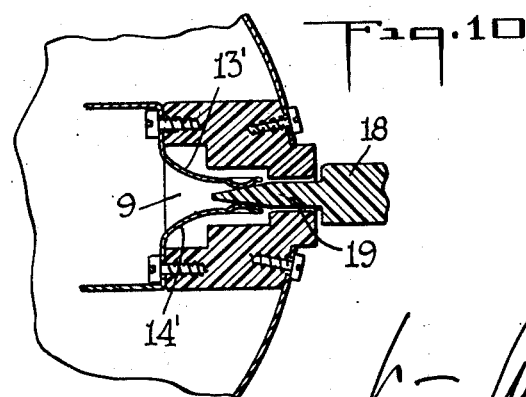

Patented Apr. 20, 1954

2,676,241

UNITED STATES PATENT OFFICE 2,676,241

ELECTRIC COOKING UTENSIL

Peter Schlumbohm, New York, N. Y.

Application May 21, 1953, Serial No. 356,469

2 Claims. (Cl. 219—44)

The present invention refers to electrically heated pots and pans and more specifically to an electric water pitcher. The invention is illustrated by way of example in Figure 1 to Figure 10 of the accompanying drawings.

Figure 3 is a cross section through the bottom of the pitcher, illustrating the electric equipment and showing a section along the lines 3—3 of Figure 1.

Figure 4 is a top view of Figure 3.

Figure 5 shows partly in section, partly in view, a handle detail of Figure 1.

Figure 6 is a section along the lines 6—6 of Figure 5.

Figure 7 is a section along the lines 7—7 of Figure 5.

Figure 8 shows a modification of the handle and the electric switch.

Figure 9 is a section across the line 9 of Figure 8.

Figure 10 is a section across the lines 10—10 of Figure 8.

The invention solves the problem of preventing the heating element of a pitcher from being cut in while the pitcher is handled by a person. Tilting the pitcher for pouring the hot water means that the heated walls of the pitcher are no longer covered by water and that they will become over-heated.

Inasmuch as a pitcher with boiling water can only be handled and tilted if the person is gripping the handle of the pitcher, the invention aims at:

a. Making the handle inoperative as a handle as long as the electric current is cut in.

b. Cutting out the electric current by an action which makes the handle operative as a handle.

Following the invention, the handle forms a wedge between two spring elements which are part of the electrical conductor and which form a circuit breaker when separated by the wedge formed by the handle. This wedge action of the handle takes place when the handle is operative as a handle. To allow the circuit to function, the handle has to be withdrawn from its wedge position and only then, while the handle is inoperative as a handle, can the current flow through the heating element.

The example of an electric pitcher shown in the accompanying drawings is not of my invention. It is a standard electric pitcher. My invention is restricted to the function of the handle as a safety measure, and this invention of mine may well be applied in analogy to the example shown to any other electric cooking utensil.

Figure 1:
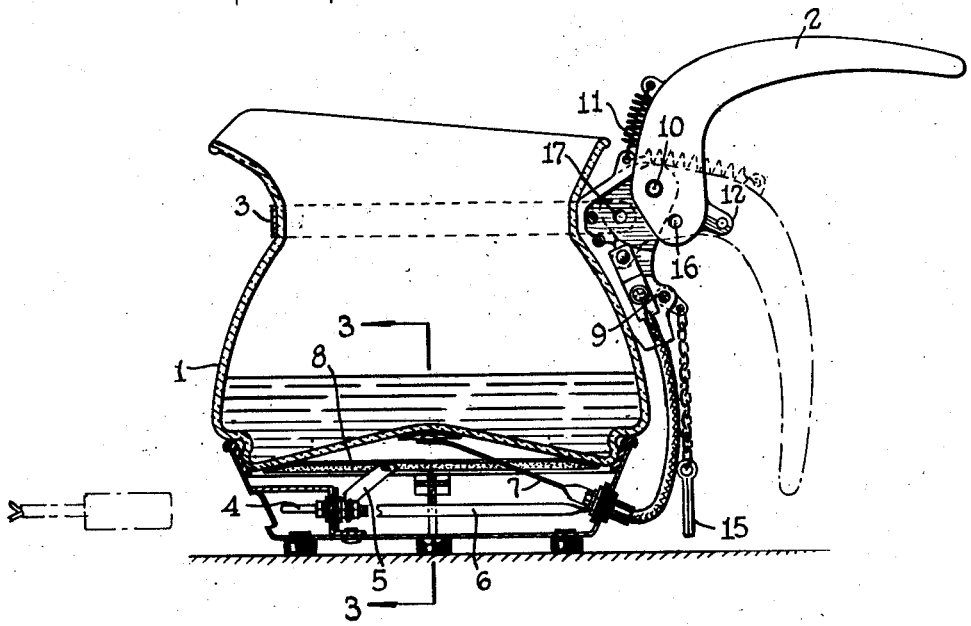
Figure 1 shows a picture of the invention seen from the side, partly in vertical section, partly in view.
Figure 2:
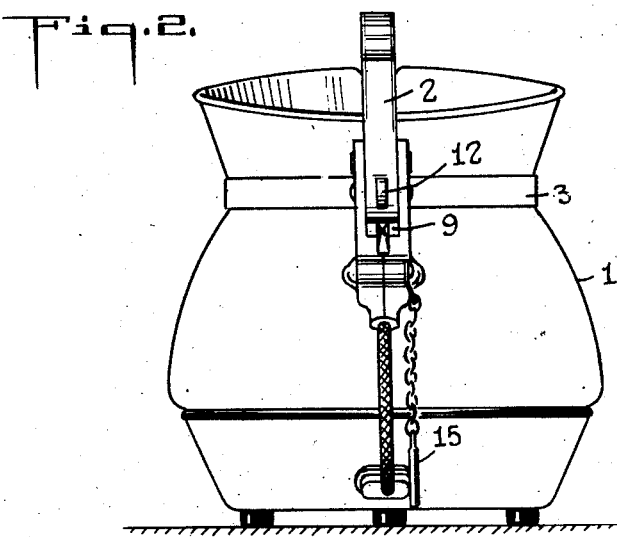
Figure 2 shows a pitcher as shown in Figure 1, seen 90° from the plane of Figure 1.

As shown in Figure 1, an electric glass pitcher 1 can be held by a handle 2 which is mounted by means of a steel ribbon 3. The glass body of the pitcher is combined with electric heating means comprising the plug 4; the leads 5, 6, 7; the resistance heating element 8; and the breaker switch 9. As further shown in Figure 1, the handle 2 can hinge around a post 10. A spring 11 by its tension retains the handle in the two end positions. The position of the handle as shown in Figure 1 and the circuit-breaking wedge 12 being outside the circuit breaker 9, is further illustrated in Figure 2.

Figures 5, 6 and 7 illustrate the handle 2 swung downward so that (see Figure 6) the wedge 12 separates the two metal contacts 13 and 14 of the circuit breaker 9. A spring bolt 15 is inserted into aligning bores 16, 17 to hold the handle 2 in this electrical cut-out position.

A modification of the wedge of the handle 2 and its wedge action is shown in Figures 8, 9 and 10. Figure 8 shows a handle in the electrical cut-out position. The lower end 18 of the handle forms the wedge 19 which in Figure 10 separates in analogy to Figure 6 the metal contacts 13' and 14' of the circuit breaker 9'.

Having now explained the nature of my invention and shown by way of example the manner in which it may be performed, I claim as my invention:

1. Electric cooking utensil comprising an electric heating element with conductors leading to and returning from the heating element, and having a handle for lifting and handling the utensil, characterized by circuit-breaking means in at least one of said conductors, and characterized by means for placing said handle either into its workable handle position or alternatively into a position in which it cannot serve as a handle, part of said handle forming part of said circuit-breaking means when being in the position in which said handle is operative as a handle.

2. Cooking utensil with a built-in electric heating element having an electric plug and an electrical conductor leading from one pole of the plug to the electric heating element and from there back to the other pole of the plug, and having a handle for lifting and handling the utensil, characterized by a circuit breaker in said conduit adapted to break the electrical conductor by flexible contact pieces being separated by a wedge, and characterized by a handle and by means for placing this handle either into its workable handle position or alternatively in a position in which it could not serve as a handle, part of said handle being adapted to form said wedge for breaking the electric circuit and said means making this circuit-breaking wedge action of said part of said handle possible during the position in which said handle is operative as a handle, and said means removing said wedge and thereby establishing the electrical circuit when said handle is placed in said other position in which it could not serve as a handle.

References Cited in the file of this patent
UNITED STATES PATENTS

| Number | Name | Date |
|---|---|---|
| 1,603,425 | Steere | Oct. 19, 1926 |
| 1,717,040 | Kaufman | June 11, 1929 |
| 2,660,658 | Wagner | Nov. 24, 1953 |